(No Model.)
5 Sheets—Sheet 1.

F. H. RICHARDS.
WEIGHING MACHINE.

No. 589,280.  Patented Aug. 31, 1897.

Witnesses;
O. W. Smith
Fred. J. Dole.

Inventor
F. H. Richards.

(No Model.) 5 Sheets—Sheet 5.

F. H. RICHARDS.
WEIGHING MACHINE.

No. 589,280. Patented Aug. 31, 1897.

Witnesses:
O. W. Smith
Fred. J. Dole.

Inventor;
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 589,280, dated August 31, 1897.

Application filed June 22, 1897. Serial No. 641,743. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, certain of the improvements being particularly applicable to machines of the kind disclosed by Letters Patent No. 572,067, granted to me November 24, 1896.

One of the objects of the invention is to provide stream-supplying means for the weighing mechanism, embodying a supply device, such as a hopper, and a movably-mounted valve adapted to cut off a stream of material flowing from the supply device and also supported for independent rotation about an axis transverse to its cut-off movement, means being employed for rotating the valve as it closes, whereby the discharge edge of said valve is caused to cut through the supply-stream, thereby removing the tendency on the part of the latter to check or retard the closure of the valve, and the discharge edge of the valve is preferably serrated to aid further its rapid movement through the descending column of material from the supply device.

Another object of the invention is to furnish weighing mechanism embodying a swinging load-discharger having a valveless opening, a conduit supported independently of the weighing mechanism, means for conducting to the latter a supply of material in excess of the predetermined load, the surplus passing through said opening and into the conduit, and means whereby the predetermined load will be discharged and the load-discharger swung to a position to divert the stream flowing through said opening away from the said conduit.

In the form of the invention illustrated the closer for the load-receiver, which constitutes one of the members of the weighing mechanism, serves as a load-discharger, it being furnished, preferably, with a spout shiftable into and out of alinement with a surplus-receiving conduit situated below the weighing mechanism.

Figure 1:
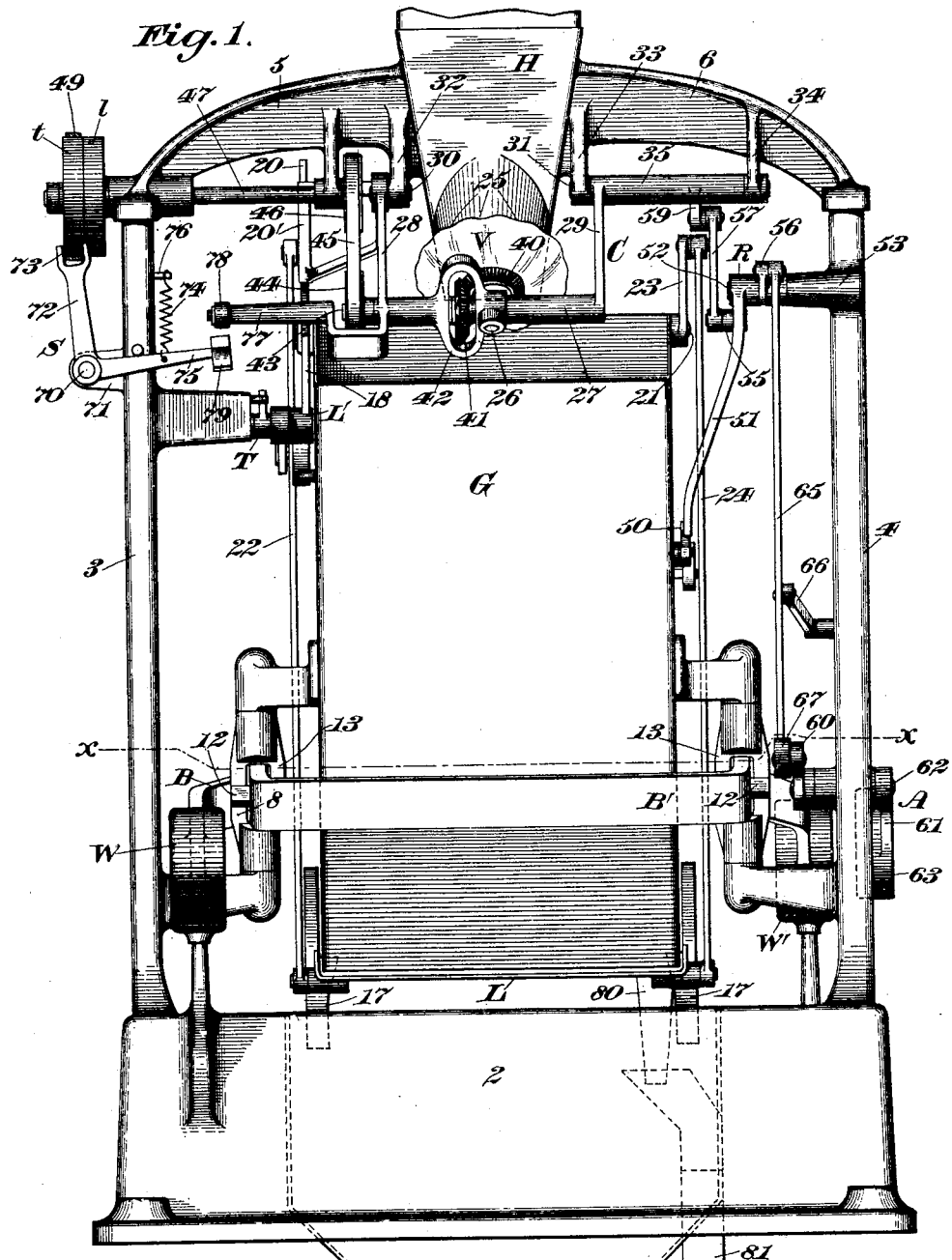
Figure 2:
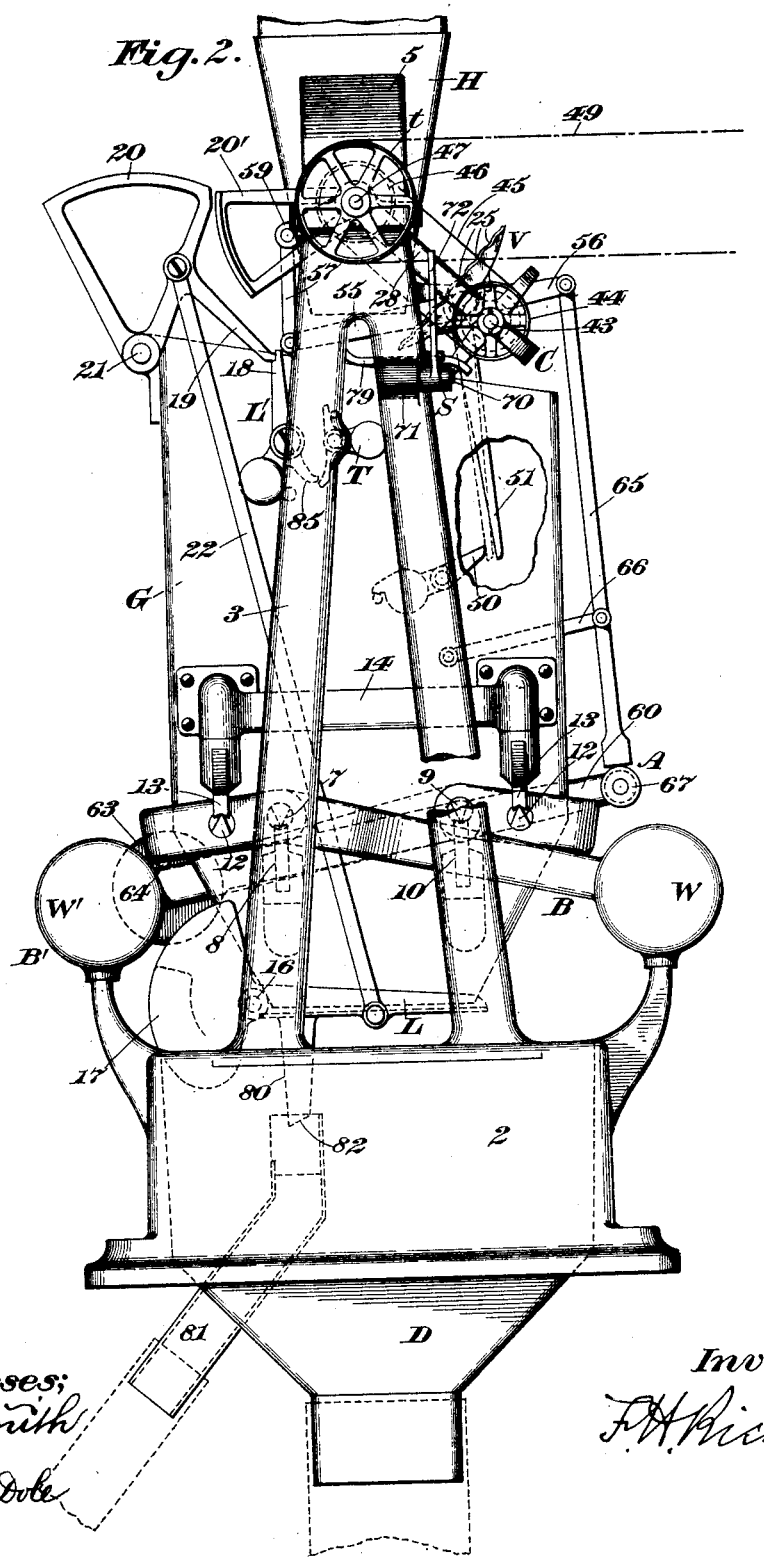
Figure 3:
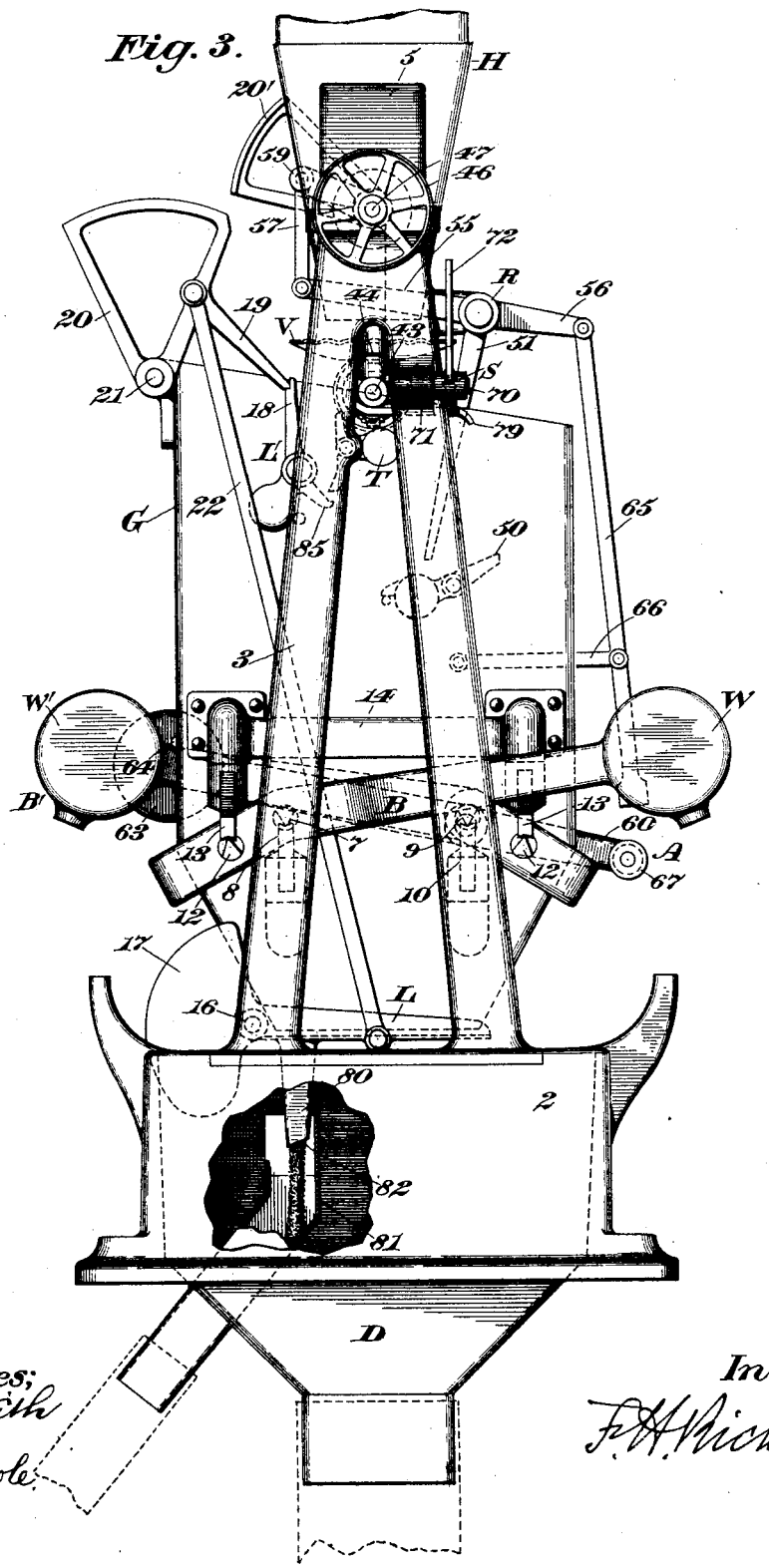
Figure 4:
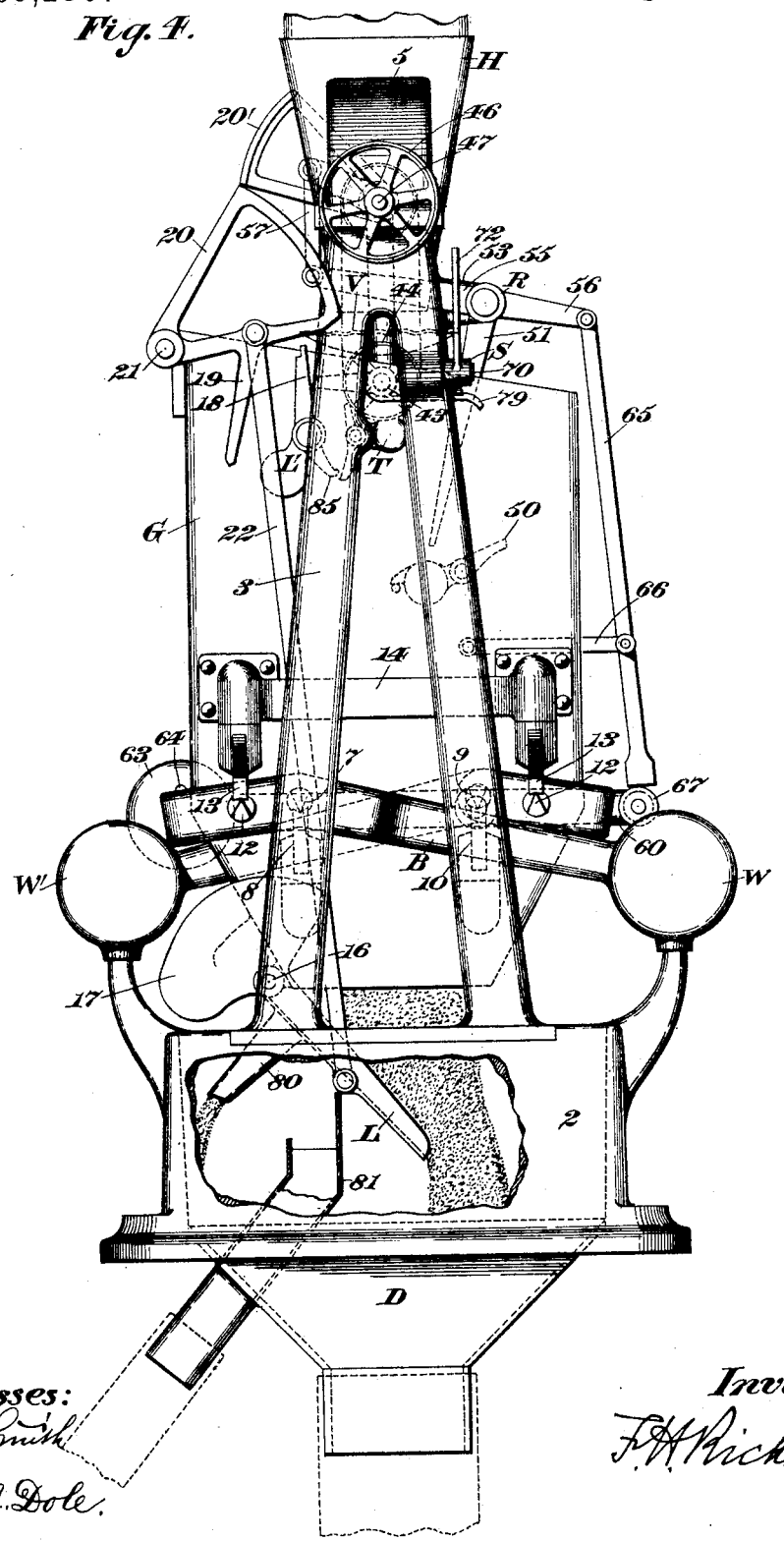
Figure 5:
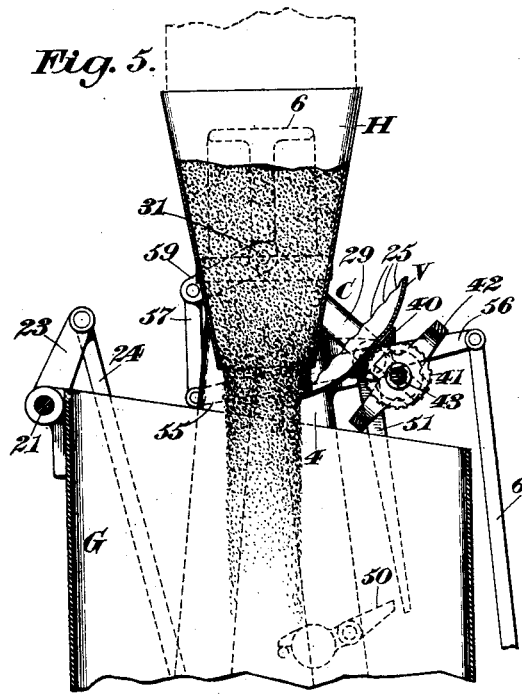
Figure 6:
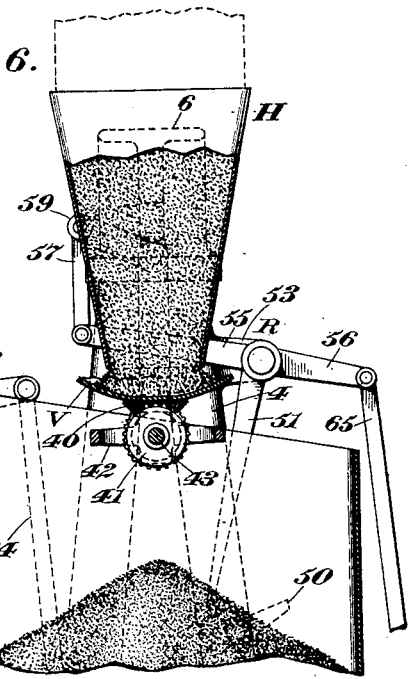
Figure 7:
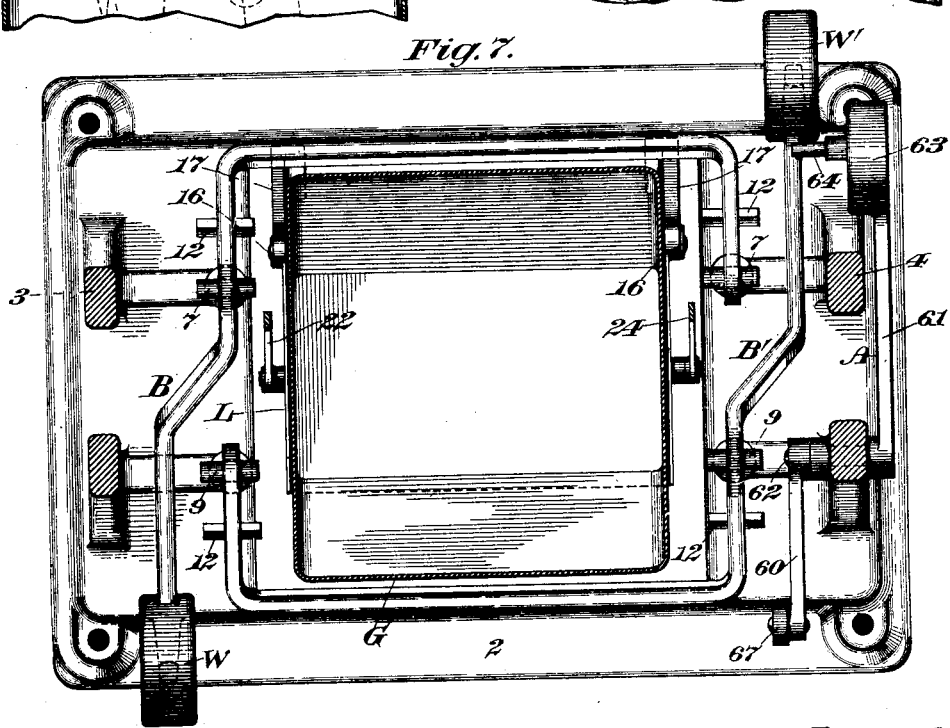

In the drawings accompanying and forming part of this specification, Figure 1 is a rear elevation of my improved weighing-machine. Figs. 2, 3, and 4 are side elevations of the machine as seen from the left in Fig. 1, showing the positions occupied by the parts during the weighing and discharging of a load, portions of the framework being broken away to illustrate certain features of the invention. Figs. 5 and 6 are longitudinal central sections of the supplying means and the upper half of the load-receiver, representing, respectively, the stream as flowing into and cut off from the load-receiver; and Fig. 7 is a sectional plan view, the section being taken in the line $x\ x$, Fig. 1.

Similar characters designate like parts in all the figures of the drawings.

The framework for sustaining the different parts of the machine is illustrated consisting of the chambered base or bed 2, the side frames or uprights 3 and 4, and the brackets 5 and 6, which extend oppositely from the supply-hopper.

The weighing mechanism in the present instance consists of a load-receiver, as G, and a plurality of supporting scale-beams, as B and B', the latter being mounted on the framework, as is usual. Each of the beams is shown in Fig. 7 consisting of a longitudinal bar, one of the beams or bars being bent to extend partially around one end of the load-receiver and the other beam or bar being bent to extend partially around the opposite end of said load-receiver, whereby it is possible to employ beams possessing a high leverage and occupying a comparatively small amount of space.

The beam B carries at suitable points thereon the usual knife-edges, as 7, located at opposite sides of the load-receiver and resting on the usual knife-bearings 8, connected with the side frames 3 and 4, the beam B' being equipped with a similar pair of knife-edges, as 9, resting on the V-shaped bearings 10 on the side frames 3 and 4, respectively, said knife-edges 9 being located at opposite sides of the load-receiver.

The beams B and B' are furnished with a second set of knife-edges, as 12, on which rest the notched bearings 13, connected at equidistant points with the hangers 14, fixed to opposite sides of the load-receiver. Each of the scale-beams has secured thereto a counterpoise, such as a weight. The counterpoise-weight for the beam B is designated by W, and the counterpoise-weight for the beam B' is designated by W', said weights being joined to the opposite extremities of each of the scale-beams.

The load-receiver G has the usual discharge-outlet, preferably covered by a closer, as L, pivoted, as at 16, near one side of the discharge-outlet and furnished with the counterweighted plates 17 at each side thereof, adapted to return the closer to its shut position on the discharge of a load.

The closer L is held normally in a shut position by a latch, as L', of ordinary construction, counterweighted and pivoted near the upper end of the load-receiver, a shouldered arm 18 on said latch being adapted to engage the coöperating arm 19 of the rocker 20. The rocker 20 is attached to one end of the rock-shaft 21, journaled in brackets on the upper forward side of the load-receiver, and is connected with the closer L by the rod 22, pivoted at its opposite ends, respectively, to said parts. The shaft 21 carries at its opposite end the crank-arm 23, connected by a rod 24 with the opposite side of the closer L, the rods 22 and 24 moving in parallelism as the closer L reciprocates.

My present invention comprehends the provision of means for overloading and for subsequently effecting the removal of the surplus from the weighing mechanism—that is to say, a supply of material is conducted to the weighing mechanism in excess of the predetermined load, the surplus gravitating through a valveless opening formed, preferably, in the closer L, as will hereinafter appear. The hopper H, to which I have previously referred, in connection with a valve, constitutes a convenient means for overloading the load-receiver of the weighing mechanism, said valve being preferably maintained in its wide-open position until an overload is in the load-receiver G.

The valve for the hopper H is designated by V, it being preferably oscillatory and also rotative about an independent axis transverse to its axis of cut-off movement, so that as it closes the discharge edge of the valve will be caused to cut through the column of material descending from the hopper H, thereby to permit the valve rapidly to close. The valve V is a disk valve, its outer edge or rim being serrated, as at 25, whereby its action, as it passes through the supply-stream, will be facilitated, said serrated edge presenting to the stream a saw-like surface.

The valve V has depending substantially centrally therefrom the spindle or stud 26, working in a bearing formed in the transverse member 27 of the oscillatory valve-carrier C, said transverse member 27 being secured to the arms 28 and 29 of the carrier. Said arms have journal-openings at their upper ends for receiving the pivot-screws 30 and 31, carried by the arms 32, 33, and 34 on the brackets 5 and 6, respectively, the pivot-screw 31 passing through the longitudinal sleeve 35 on the arm 29.

Any suitable means may be employed for imparting the necessary rotary movement to the valve V as it closes. For this purpose I have represented gears driven by mechanism involving a series of loose and fast pulleys and a belt shiftable from one of the pulleys to the other, so that the rotation of the valve can be stopped when it reaches the end of its cut-off stroke.

The spindle or stud 26 has secured thereto the bevel-gear 40, meshing with a driving bevel-gear 41, situated in the loop 42 on the transverse member 27 of the valve-carrier C. The driving bevel-gear 41 is carried by the shaft 43, working in a bore in the transverse member or bar 27 of the valve-carrier, said shaft carrying a pulley 44, connected by a belt 45 with a pulley 46 on the power-shaft 47, the axis of the shaft 47 being in line with the axis of oscillation of the valve-carrier C. The shaft 47 works in bearings on the bracket 5 and supports at its outer end the tight and loose pulleys $t$ and $l$, the belt 49 of which is shown by dotted lines in Fig. 2 and in section in Fig. 1.

The valve V is self-closing, it with the carrier being of sufficient weight to cause the shutting of said valve when it is released, the latter, as hereinbefore stated, being preferably maintained in its wide-open position until an overload is in the load-receiver G. The valve is maintained in its primary position for a predetermined length of time by its actuator and then by a stop, as 50, on the load-receiver, said stop being of the "by-pass" type, familiar in this art, mounted on the load-receiver and adapted to engage the depending rod 51 on the rocker R, the latter being supported by the pivot 52 on the offset 53 of the side frame 4. The rocker has the oppositely-disposed arms 55 and 56, the arm 55 being pivoted to the link 57. The link 57 is pivoted at its upper end to the crank-arm 59 on the sleeve 35 of the valve-carrier.

In Fig. 2 the valve V is shown as having been just opened, the lower end of the rod 51 being substantially in contact with the by-pass 50, although the valve at this time is held open by a valve-actuator, as will hereinafter appear.

When the load-receiver has received a certain amount of material, it will descend, thereby permitting the rod 51 to move until it abuts against the by-pass stop 50, said stop thereby arresting the further closure of the valve and until it descends below the rod 51, this fact indicating the overloading of the load-receiver G.

The actuator for swinging the valve V open is designated by A, and it consists of the oppositely-disposed arms 60 and 61, pivoted to the side frame 4 and located at opposite sides thereof by the pivot 62, said arms forming, in effect, a lever. The arm 61 of the actuator is counterweighted, as at 63, said weight being furnished with a projection 64, resting on the beam B' at a point near the weight W'. The arm 56 of the rocker, to which I have hereinbefore referred, has pivoted thereto the rod 65, connected by the guide-link 66 to the side frame 4, the free end of said rod bearing against the projection or antifriction-roll 67 on the arm 60 of the actuator A.

As the load-receiver descends, the beam-weight W' and actuator 63 will be elevated, the arm 60 of the actuator thereby being carried away from the rod 66. When the valve V is released, the rod 65, as will be apparent, is thrust downward with the end thereof in contact with the projection 67 of the actuator. When the actuator reaches its shifted position, it will be temporarily held by interlocking-stop mechanism, although the beam mechanism can return to its initial position.

When the actuator returns to its position shown in Fig. 2, the rod 65 will be thrust upward, thereby swinging the valve V from under the hopper and the rod 50 into contact with and by the by-pass stop 50 on the load-receiver.

When the valve reaches the end of its cut-off stroke, the rotation thereof will be stopped, this result preferably being obtained by shipping the belt 49 from the tight pulley $t$ to the loose pulley $l$, the shipper for the belt 49 being designated by S and being operated by an actuator coöperative with the valve. The belt-shipper S, in the form shown, consists of an angle-lever pivoted, as at 70, to the lug 71 on the side frame 3, the arm 72 of said shipper being provided with the usual belt-engaging fingers 73, between which the belt 49 travels.

The belt 49 is preferably maintained in contact with the pulley $t$, a coiled retracting-spring 74, secured to the arm 75 of the belt-shipper and to the extension 76 of the frame member 3, being furnished to accomplish this result. The arm 75 of the belt-shipper is disposed in the path of movement of the actuator operative with the valve, said actuator being designated by 77 and consisting of the lateral extension of the valve-carrier C, in line with the transverse member 27 thereof, said actuator being furnished with an antifriction-roll 78, adapted to ride along the curved upper surface of the shoe 79, fixed to the inner end of the shifter-arm 75.

When the valve V is released, as hereinbefore set forth, the roll 78, when said valve has nearly reached the end of its cut-off stroke, will impinge against the shoe 79, thereby lowering the arm 75 of the shipper S and swinging the arm 72 of said shipper to the right, so as to shift the belt 49 from the tight pulley $t$ to the loose pulley $l$, whereby the rotation of the shaft 47 and the intermediate driving elements between said shaft and the valve V will be stopped to arrest the motion of the valve.

The closer L is furnished with the depending valveless spout 80, whose bore is of reduced area, so as to permit a stream of rather small volume to gravitate therefrom and into the conduit 81, with which said spout is normally in alinement and which is supported independently of the weighing mechanism. The surplus from the weighing mechanism is intended to pass from the load-receiver G through the spout 80 and into the conduit 81, the latter being passed through and secured in an opening in the discharge-hopper D.

The material flowing into the conduit 81 can be disposed of in the manner shown by the Letters Patent hereinbefore referred to.

It will be understood that while the material is supplied to the load-receiver a stream is constantly flowing from the spout 80; but the load-reducing opening 82 at the end of the spout is of such small size as to prevent any great amount of material passing from said load-receiver before the discharge of a load, so that when a large stream is flowing from the hopper H the load-receiver can be overcharged in a comparatively short space of time to cause the load-receiver to descend.

It will be remembered that when the valve V is closed under the hopper H the load-receiver is overloaded, the latter at this time having reached the limit of its downstroke, as shown in Fig. 3, and the surplus passing through the spout 80 into the conduit 81. As the load-receiver lightens by the withdrawal of material therefrom it will rise, and when the surplus has been entirely removed the closer-holding latch L' will be tripped, so that the mass in the load-receiver, by acting against the closer, can force the latter open to discharge the predetermined load into the discharge-conduit D, as shown in Fig. 4. On the opening of the closer, as shown in said figure, the spout 80 will be swung out of alinement with the conduit 81, so as to divert the stream flowing from the load-reducing opening away from said surplus-receiving conduit 81 and direct it into the discharge-conduit D.

The tripper for the closer-holding latch is designated by T and is of the well-known by-pass type, carried by the side frame 2, and adapted on the ascent of the load-receiver to be engaged by the arm 85 of the latch L' to disengage the latch-arm 18 from the coöperating arm 19 of the rocker 20. The valve and closer are furnished with the usual interlocking stops, the rocker 20 constituting one of said stops and the other being designated by 20' and carried by and obliquely extending forward from the valve-carrier C, said stops being substantially similar in construction and mode of operation to the interlocking stops shown and described in the hereinbefore-mentioned Letters Patent.

The operation of the hereinbefore-described machine, briefly stated, is as follows: The closer L being shut and held in position by the latch L' engaging the arm 19 of the rocker 20 and the valve V being wide open, the rod 65, coöperative with said valve, will rest against the counterweighted actuator A, thereby to hold the valve open, and the belt 49 being on the tight pulley $t$ the shaft 47 will be driven thereby through the pulleys 44 and 46 and the belt 45, rotating the shaft 43, and consequently the bevel-gears 41 and 42 and also the valve V, so that a stream of large volume will flow into the load-receiver, as shown in Fig. 2. When a certain quantity has been received by the load-receiver, it will descend, the weights W' and 63 thereby being elevated, and the arm 60 of the actuator A, falling away from the rod 65, will permit the valve V to close for a very short distance or until the rod 51 abuts against the stop 60. The stream will then continue to flow through the load-receiver until the latter is overloaded, at which time the stop 50 will be carried to a point below the rod 51 to release the valve, so that it can be promptly shut, said valve, through the described mechanism, being rotated on its closing stroke. When the valve has nearly reached the end of said stroke, the actuator 77, operative therewith, will strike the shoe 79 of the shipper S, thereby lowering the shipper-arm 75 and swinging the shipper-arm 72 to the right to shift the belt 49 from the tight pulley $t$ to the loose pulley $l$ to stop the rotation of the valve. During the supply of material to and overloading of the load-receiver G a stream of small volume has been flowing through the spout 80 and into the surplus-receiving conduit 81, this stream flowing, after the surplus is in the load-receiver, as will be apparent, so that as the surplus is withdrawn the load-receiver will rise, and when it has been all removed the latch-arm 85 will strike the tripper T, thereby disengaging the latch L' from the rocker-arm 19 to release the closer L. When the closer is released, it will be forced open by the weight of the material sustained thereon, as represented in Fig. 4, the load being discharged into the conduit D and the spout 80 being swung out of line with the surplus-receiving conduit 81. When the load has been discharged, the closer L will be shut and the several parts of the machine will be returned to their initial positions to repeat the operation.

Having described my invention, I claim—

1. The combination of weighing mechanism embodying a load-receiver; a supply-hopper situated over the load-receiver and adapted to deliver a stream of material thereto; a valve movably mounted upon the framework to cut off said stream and supported for independent rotation; and means for rotating said valve during its closing movement.

2. The combination of weighing mechanism embodying a load-receiver; a supply-hopper situated over the load-receiver and adapted to deliver a stream of material thereto; an oscillatory valve to cut off said stream and supported upon the framework for independent rotation about an axis transverse to its axis of oscillation; and means for rotating said valve during its closing movement.

3. The combination of weighing mechanism embodying a load-receiver; a supply-hopper situated over the load-receiver; and a rotary valve movably mounted to cut through a stream of material from said hopper and having a serrated edge.

4. The combination of weighing mechanism embodying a load-receiver; a supply-hopper situated over the load-receiver; and a rotary disk valve movably mounted to cut through a stream of material from said hopper and having its discharge edge serrated.

5. The combination of weighing mechanism embodying a load-receiver; a supply-hopper situated over the load-receiver; and an oscillatory rotary disk valve having its discharge edge serrated.

6. The combination of weighing mechanism embodying a load-receiver; a supply-hopper situated over the load-receiver; an oscillatory carrier mounted on the framework; and a valve for the hopper, supported for rotation by said carrier.

7. The combination of weighing mechanism embodying a load-receiver; a supply-hopper located over the load-receiver; an oscillatory carrier depending from the framework; a valve for the hopper, having a spindle supported by said carrier and provided with a gear; a shaft mounted on the carrier and provided with a coöperating gear; and a second shaft connected with the first-mentioned shaft.

8. The combination of weighing mechanism embodying a load-receiver; a supply-hopper situated over said load-receiver; an oscillatory carrier; a valve having a spindle supported by said carrier and provided with a gear; a shaft mounted on said carrier and furnished with a gear coöperating with the first-mentioned gear and also equipped with a pulley; a second shaft furnished with a pulley connected by a belt to the first-mentioned pulley; a series of tight and loose pulleys on the last-mentioned shaft; and a belt shiftable along said series of pulleys.

9. The combination of weighing mechanism embodying a load-receiver; a supply-hopper situated over said load-receiver; a valve for said hopper, movably mounted upon the framework and supported for independent rotation; and means for rotating and for stopping the rotation of the valve when it reaches the end of its cut-off stroke.

10. The combination of weighing mechanism embodying a load-receiver; a supply-hopper situated over said load-receiver; an oscillatory valve supported by the framework for independent rotation; means for rotating the valve during its closing movement; and means operative with said valve for stopping the rotation thereof when it reaches the end of its cut-off stroke.

11. The combination of weighing mechanism embodying a load-receiver; a supply-hopper situated over the load-receiver; an oscillatory carrier; a valve supported for oscillation by said carrier; driving mechanism for operating the valve independently of its cut-off movement, said mechanism including fast and loose pulleys and a belt shiftable along said pulleys; a shipper for the belt; and means operative with the valve for operating said shipper.

12. The combination of weighing mechanism embodying a load-receiver; a supply-hopper located over the same; an oscillatory carrier; a valve for the hopper, rotatively supported by the carrier; driving mechanism for said valve, embodying a series of tight and loose pulleys and a belt shiftable along said pulleys; a belt-shipping lever; and a device on the carrier for operating said belt-shipper.

13. The combination of weighing mechanism embodying a load-receiver; a supply-hopper situated over the load-receiver; an oscillatory carrier; a valve supported by said carrier; driving mechanism for operating the valve, embodying a series of tight and loose pulleys and a belt shiftable along said pulleys; a belt-shipper one arm of which is provided with a curved shoe; and a device on the valve-carrier for engaging said shoe.

14. The combination of weighing mechanism embodying a load-receiver; a supply-hopper located over the same; an oscillatory carrier; a valve supported for rotation by the carrier and having a gear; a coöperating gear; a shaft carrying said last-mentioned gear and supported by the carrier and also provided with a pulley; a second shaft furnished with a pulley connected by a belt with the first-mentioned pulley and equipped with a series of tight and loose pulleys; a belt shiftable along said series of tight and loose pulleys; a belt-shipper; a spring connected, respectively, to the belt-shipper and the framework; and a device on the carrier for engaging the belt-shipper.

15. The combination of weighing mechanism embodying a load-receiver; a supply-hopper located over the weighing mechanism; an oscillatory carrier; a valve rotatively supported by said carrier; a rocker on the framework, having oppositely-disposed arms one of which is connected with a crank-arm on the carrier and the other of which is provided with a rod; an actuator adapted to engage said rod; a depending member operative with the rocker; and a stop adapted to be engaged by said depending member.

16. The combination of weighing mechanism embodying a load-receiver; a supply-hopper situated over the load-receiver; a valve having a serrated discharge edge and supported for movement about two different axes; and means for actuating the valve to open and close the same alternately, and for also causing said serrated edge to cut through the supply from said hopper.

17. The combination of weighing mechanism embodying a movably-mounted load-discharger having a valveless opening; a conduit supported independently of the weighing mechanism; means for conducting to the latter a supply of material in excess of the predetermined load, the surplus passing through said opening into the conduit; and means whereby the load will be discharged and the load-discharger moved to a position to divert the stream flowing through said opening away from said conduit.

18. The combination of weighing mechanism embodying a swinging load-discharger having a valveless opening; a conduit supported independently of the weighing mechanism; means for conducting to the weighing mechanism a supply of material in excess of the predetermined load, the surplus passing through said opening into the conduit; and means whereby the load will be discharged and the load-discharger swung to a position to divert the stream flowing through said opening away from said conduit.

19. The combination of weighing mechanism embodying a swinging member having a spout; means for supplying to the weighing mechanism an overload or mass of material in excess of the predetermined load; main and auxiliary conduits; and means whereby said swinging member is operated to swing the spout into and out of alinement with the auxiliary conduit.

20. The combination of weighing mechanism embodying a load-receiver provided with a closer; a spout on the closer; means for supplying to the load-receiver a supply of material in excess of the predetermined load; a plurality of conduits supported independently of the weighing mechanism, one of them being located to receive the surplus which gravitates through said spout when the closer is shut; means for holding the closer shut during the supplying period; and means for effecting the release of said closer.

FRANCIS H. RICHARDS.

Witnesses:
 FRED. J. DOLE,
 F. N. CHASE.